April 14, 1964 A. P. MALIA ETAL 3,128,647
TAPER BORING BARS
Filed Feb. 2, 1961 4 Sheets-Sheet 1

April 14, 1964   A. P. MALIA ETAL   3,128,647
TAPER BORING BARS
Filed Feb. 2, 1961   4 Sheets-Sheet 2
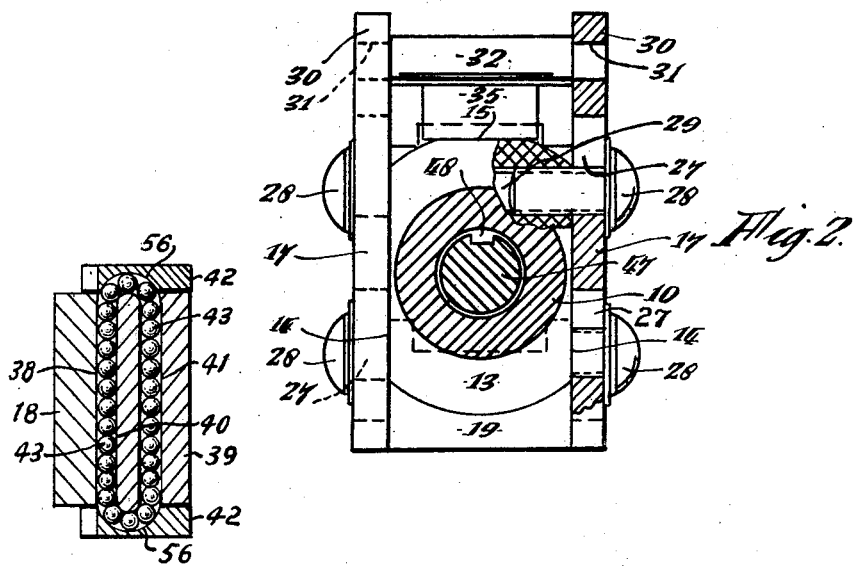
Fig. 2.
Fig. 4.
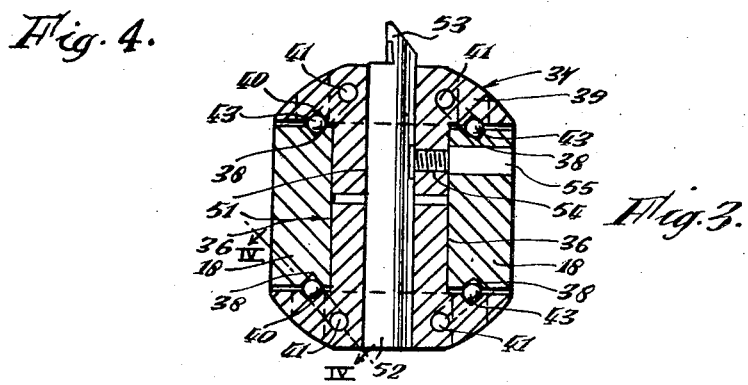
Fig. 3.
Inventors
Austin Malia
Robert Wiles
by Albert Jacobs
Attorney

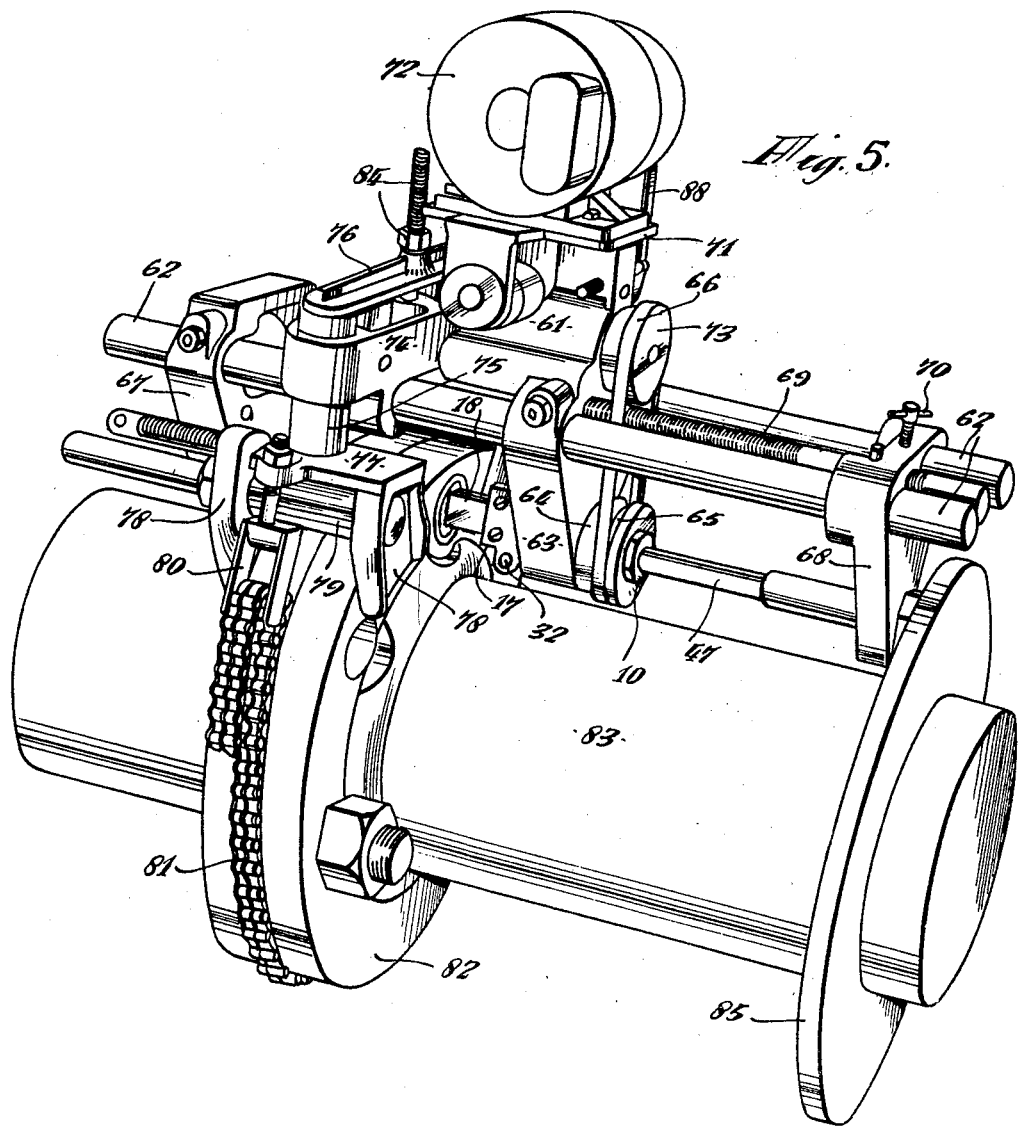

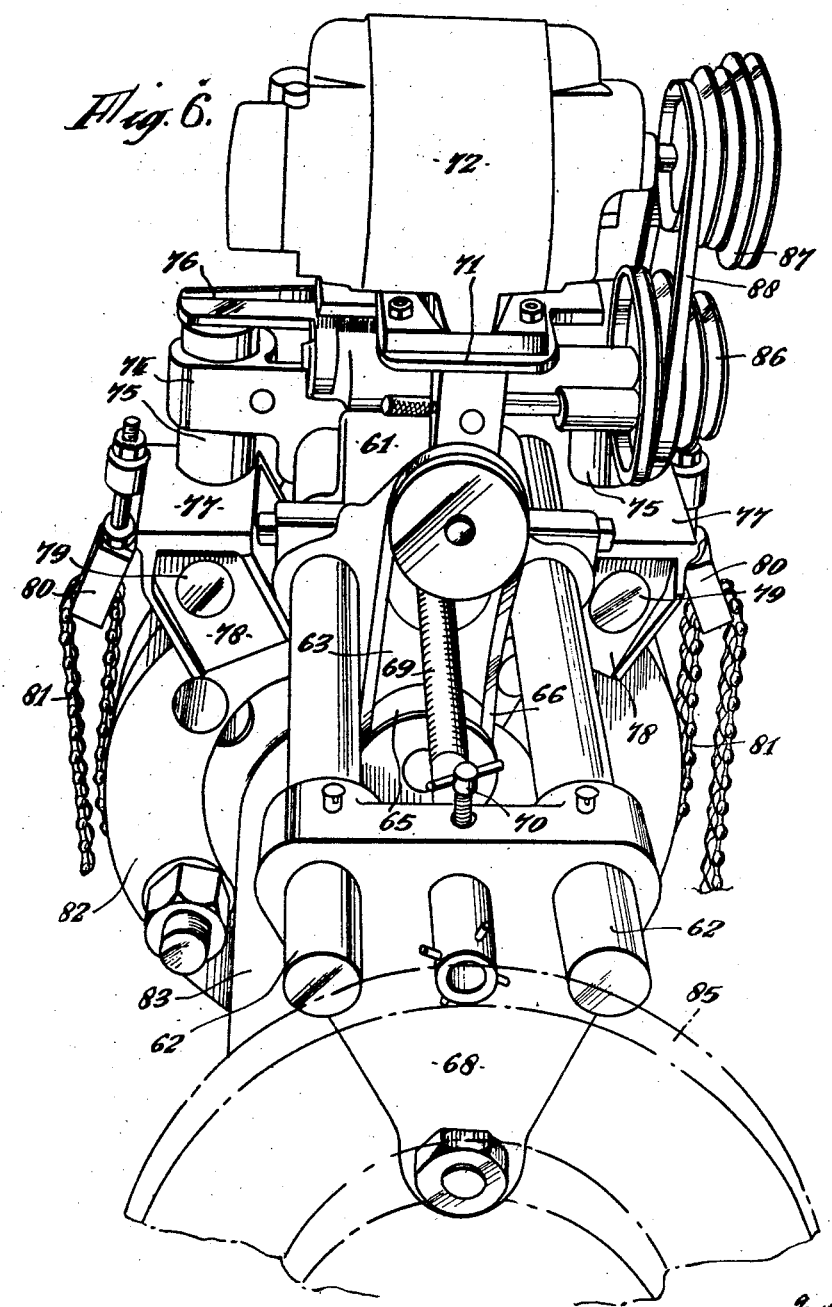

United States Patent Office 3,128,647
Patented Apr. 14, 1964

3,128,647
TAPER BORING BARS
Austin Patrick Malia and Robert Clough Wiles, Newcastle-upon-Tyne, England, assignors to said Malia and Buma Engineering Company Limited, Newcastle-upon-Tyne, England, a company of Great Britain and Northern Ireland
Filed Feb. 2, 1961, Ser. No. 86,794
Claims priority, application Great Britain June 9, 1960
6 Claims. (Cl. 77—57)

This invention relates to a boring bar for cutting taper bores, which is settable to cut a predetermined taper within a range of tapers, and which is interchangeable with a cylinder boring bar in a boring machine of the kind wherein the bar is rotatably supported in aligned head and tail stocks or steadies in extension through an initial bore which is to be enlarged.

An object of the invention is to provide a taper boring bar comprising a driving sleeve, with a head having a pair of parallel faces tangential to its axis, a pair of cutter-carrier guide bars securable each at one head end with variable lateral setting to one of said faces, and a tail spigot member to which the other, tail ends of said guide bars are pivotally secured, a cutter-carrier slidable between and firmly guided by said guide bars, a displacing member axially slidable within said driving sleeve, means for preventing relative rotation of said displacing member and said sleeve, connecting means between the inner end of said displacing member and said cutter-carrier, and means serving to predetermine the lateral setting of said guide bar head ends relative to said driving sleeve head.

The arrangement is such that when, in a boring machine, the driving sleeve is secured within a rotatable, annular driving element, the tail spigot is mounted in an aligned bush of a tail steady, and the outer end of said displacing member is borne upon by an axially movable feed element, the whole assembly is unitarily rotatable and the cutter-carrier can be caused to move along said guide bars towards the tail-spigot, whereby the radially projecting end of a cutter tool secured in said carrier is caused to follow a frusto-conical locus of predetermined taper and to cut a tapered internal surface in a bore which is to be enlarged, whether said bore is initially parallel or tapered.

Since in the course of such operation the cutter-carrier moves radially inwards with respect to the common axis of said displacing member and the driving sleeve in which said member is mounted, and further since the rate and extent of such radial movement vary with the taper, according to another object of the invention the aforesaid connection between the cutter-carrier and the inner end of said displacing member is made radially or transversely displaceable while being axially positive. For example, the displacing member may have at its inner end an eye the interior of which is torically ground, while the cutter-carrier has in its connected end a recess to house said eye with space for lateral or transverse displacement, and a hardened pin traversing said recess and passing through said eye.

For presetting the lateral displacement of the head ends of the guide bars, the driving sleeve head may have a tangential anvil flat machined truly perpendicular to the pair of parallel faces to which the bar ends are secured, while said bars have lugs supporting a calibrated roller or pin or like element strictly perpendicular to said parallel faces, a selected one of a plurality of calibrating blocks being secured to said anvil flat and the bar ends being secured to said parallel faces with said roller or pin in contact with said calibrating block.

The distance between the axis of the pivot whereat the bars are secured to the tail spigot member and the axis of said roller or pin is precisely determined, and may be defined as the hypotenuse length. The perpendicular distance between the axis of said roller and the axis of the driving sleeve is determined by the sum of the constant radial distance of said anvil flat from said sleeve axis, the constant radius of said roller, and the thickness of the selected calibrating block. Evidently, the ratio of said perpendicular distance to said hypotenuse length is the sine of the angle of the guide bars to the axis of the assembly, and hence the angle of the taper to be bored.

To afford firm guidance of the cutter-carrier each of the supporting bars may have an opposed pair of outwardly-open V-grooves, portions of the carrier overhanging said guiding grooves having corresponding inwardly-open V-grooves and bypass channels with suitable outward and inward end deflectors whereby series of bearing balls are caused to re-circulate from one end to the other of the V-grooves on said carrier portions, and in contact with the grooves in the bars.

Another object of the invention is to provide a boring machine in combination with a taper boring bar as hereinbefore recited, and more particularly the combination of a boring machine and said taper boring bar which is intended for boring holes in the flanges of shaft couplings, the machine comprising a pair of parallel frame bars, means serving to secure said frame bars to an element, such as a flange coupling, having an initial bore to be enlarged, a head stock mounted on said frame bars, an annular driving element rotatable in said head stock on an axis parallel to the axes of said frame bars, a tail steady adjustably slidable on said frame bars, a feed member slidable on said frame bars, a lead screw engaging said feed member, and means in said head stock serving to displace said lead screw axially, in combination with a taper boring bar as hereinbefore recited having its driving sleeve secured in said annular driving element to be rotatable therewith, its tail spigot member mounted for rotation in said tail steady and the outer end of its cutter-carrier displacing member disposed to be borne upon for axial displacement by said feed member.

An embodiment of a taper boring bar and an embodiment of a boring machine incorporating such a boring bar will be described by way of example with reference to the accompanying drawings wherein:

FIGS. 1A and 1B comprise jointly an axial section of the taper boring bar,

FIG. 2 is a transverse section on the line II—II of FIG. 1A, partly in section,

FIG. 3 is a transverse section on the line III—III of FIG. 1B;

FIG. 4 is a section on the line IV—IV of FIG. 3,

FIG. 5 is a perspective side view of a boring machine, and

FIG. 6 is a perspective end view of said machine.

Figure 1:
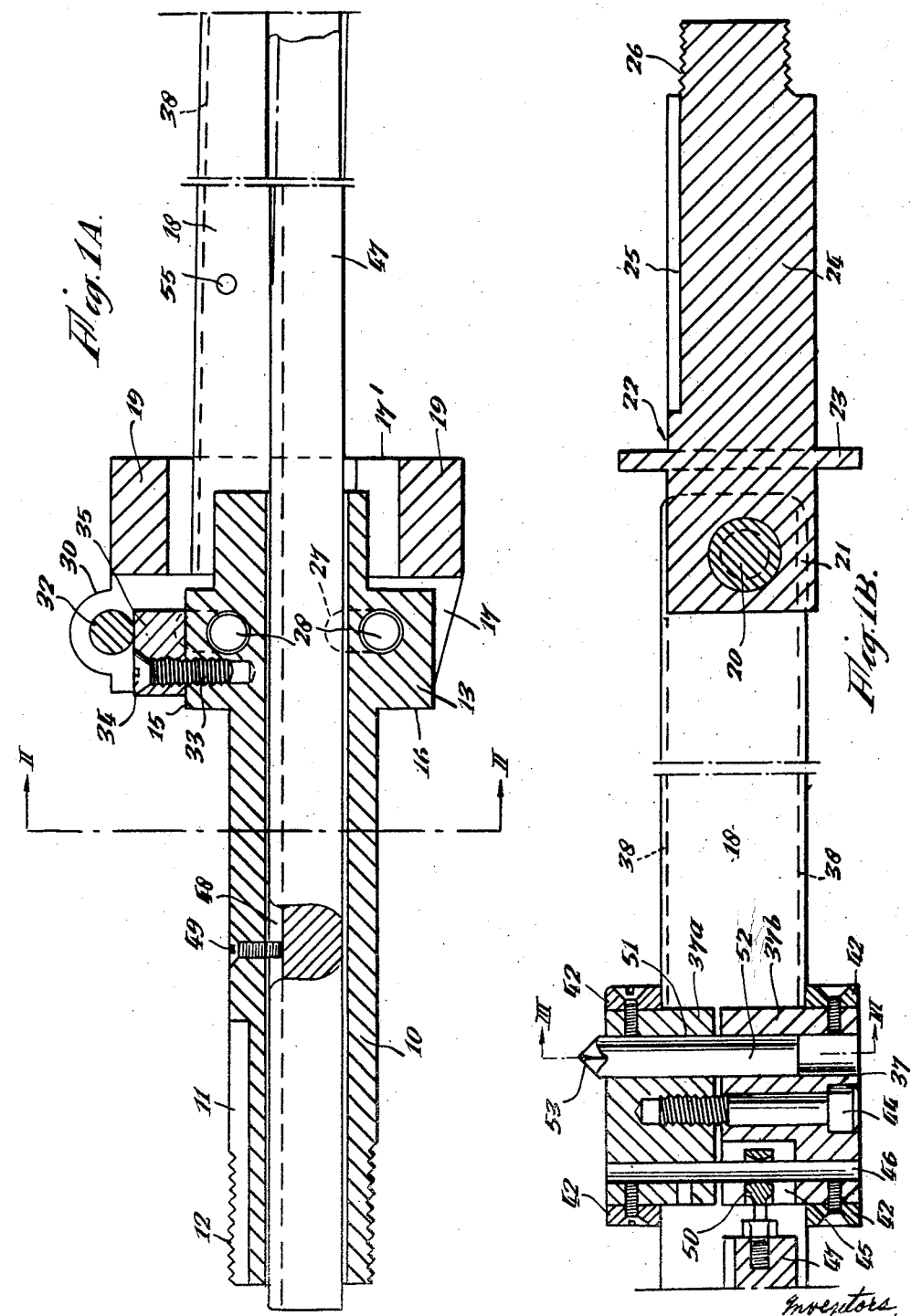

In the taper boring bar illustrated in FIGS. 1–4 of the drawings, a driving sleeve 10 has a peripheral surface with a keyway 11 and an externally screw-threaded portion 12 at one end, and a head 13 at the other end which has a pair of relatively long, parallel, tangential flat faces 14 and a tangential anvil flat 15 perpendicular to said parallel faces. Such sleeve 10 is securable in an annular driving element of a boring machine as will be described by locking said element between the transverse shoulder 16 of said head 13 and a nut on said screw-threaded portion 12, and is made rotatable with said element by insertion of a key. Attachable to said pair of flat faces 14 are two cheek plates 17 each of which is rigidly secured to a head end of one of a pair of flat guide bars 18. The cheek plates have an axial dimension substantially twice that of said head 13, and their halves 17′ that do not engage said pair of faces are interconnected by upper and lower spacing members 19 precision machined to control the mutual spacing of said bars 18.

The other, tail ends of the pair of bars 18 are bored to receive a transverse pin 20 which is mounted in a portion 21 of a tail spigot member 22 having parallel lateral faces likewise machined to effect precise spacing of these tail ends of the bars. Said spigot member 22 has beyond its rectangular portion 21 a locating flange 23 and a cylindrical shank 24 provided with a keyway 25 and a screw-threaded portion 26, which may be of reduced diameter, on its outer end. Thereby the spigot member 22 is adapted for insertion in a bush mounted in an anti-friction bearing, for example a needle roller bearing, in a tail steady of a boring machine which is axially adjustable. The tail spigot 22 is caused to rotate with said bush by the engagement in its keyway 25 of a feather in the inner surface of said bush, and may be firmly secured by locking the bush between said locating flange 23 and a nut on the screw-threaded end 26 of the spigot.

Each of the aforesaid cheek plates 17 has two short slots 27 with semi-circular ends, for example about 3/8" diameter by 3/8" centres, which slots are traversed by two pairs of set bolts 28 entering screw-threaded bores 29 made perpendicularly in said pair of parallel faces 14 of the driving sleeve head 13. Further, the upper part of each cheek plate has a lug 30 with a transverse bore 31, the pair of bores being made by precision grinding so that the distance of their axis from the axis of the tail spigot pin 20 is precisely determined, this being the hypotenuse distance as above referred to for calculation of the taper. In said bores 31 is housed or mounted a transverse, precision ground pin or roller 32, the radius of which is a factor in the perpendicular distance aforesaid. Said anvil flat 15 of the head 13 has two screw-threaded bores 33 to receive set screws 34 whereby a selected calibrating block 35 is secured to said flat, the aforesaid transverse roller or pin bearing on an uninterrupted ground portion of the outer surface of said block so that when the set bolts 28 are tightened to secure the cheek plates 17 to the head 13, the angle of the guide bars 18 to the axis of the drive sleeve 10 is precisely determined.

Said guide bars 18 are rigid and fully machined so that their inner opposed surfaces 36 (FIG. 3) define a long opening, rectangular in transverse section, wherein a cutter-carrier 37 is slidable. Each of the upper and lower surfaces of the said guide bars (which may for example be about 1¼" deep by 7/16" thick when the hypotenuse distance is about 15") is provided with a longitudinal V-section groove 38. The cutter-carrier is preferably of H-section with portions 39 extending over the grooved surfaces of the bars 18, said portions having corresponding and opposed V-section grooves 40, and adjacent each of these grooves a longitudinal bypass bore 41 from end to end. Above and below the guide bars a crescent form end plate 42 is secured to extend across the overhanging portions at each end of the carrier, and opposite the ends of the V-grooves 38, 40 and said parallel bores 41 in the carrier, said end plates are internally machined to provide deflectors 56 (as shown in FIG. 4) for a series of bearing balls 43, which in the displacement of the cutter-carrier 37 along the guide bars 18 are consequently caused to run as a series around the circuit formed by the opposing grooves 38 in one guide bar face and 40 in the overhanging portion of the carrier, the parallel bore 41 in the carrier and the two deflectors presented by the end plates 42. The cutter-carrier 37 is thus supported and guided firmly but with minimum friction.

The cutter-carrier may be made with two identical half portions 37a, 37b each of T-section, the bases of the stalk portions being machined so that the two halves can be secured together between the bars 18 by screw means 44 (FIG. 1B) with or without the interposition of shims.

In the stalk portion 37b comprising part of the body of the carrier 37 there is formed, at the end adjacent the driving sleeve 10, a recess 45 which is traversed by a ground pin 46 located parallel to the inner surfaces of the guide bars 18 and traversing the axis of the drive sleeve 10. In the bore in said sleeve is mounted a displacing member 47 for the carrier 37 in the form of a long rod having a longitudinal keyway 48 which is entered by the inner end of a set screw 49 inserted radially through the sleeve 10, whereby said rod is caused to rotate with the sleeve, and consequently with the cutter-carrier, while being axially displaceable relative to the sleeve. At its inner end, said rod 47 is provided with an eye 50 embracing the aforesaid pin 46 in the cutter-carrier, and this eye is preferably internally ground to toric form and hardened so that it engages the pin 46 without appreciable freedom for relative axial movement, while at the same time the pin is transversely movable through the eye 50, as is required when the cutter moves along the inclined guide bars 18.

There is further provided in the cutter-carrier a bore 51 parallel to the inner faces 36 of the guide bars and adapted to receive the shank of a cutting tool 52, the tooth 53 of which projects radially from one surface of the carrier. The tool 52 may be secured in the carrier by at least one set screw 54, and to enable access to the head of this screw 54 at least one of the guide bars 18 may have adjacent its cheek plate 17 a hole 55 (FIG. 1A) so located that when the carrier 37 is brought to that end of the guide bars the set screw 54 for locking the tool is accessible through said hole 55.

The taper boring bar as above described is more particularly intended for use in a boring machine as shown in FIGS. 5 and 6, wherein drive gearing is enclosed in a gear case 61 mounted on a pair of frame bars 62 so as to be securable to the element to be bored, the mounting for said gear case comprising a head stock 63 in which is freely rotatable, for example in a series of needle rollers, an annular driving element such as a sleeve 64 with a peripheral groove 65 for a V-form belt 66. As above mentioned, the taper boring bar is mounted with its driving sleeve 10 secured in such annular pulley 64, and the tail spigot 22 of the boring bar is mounted in a bush in a tail steady 67 which is slidable upon said frame bars 62. The displacing rod 47 of the boring bar extends initially in a direction away from the member to be bored, and is abutted by a feed member 68 also slidable upon the frame bars 62 and engaged by one end of a lead screw 69, mounted between and parallel to said frame bars, and engaged by a nut within said gear case 61, said nut being rotatable but not axially movable, with the result that when said nut is rotated the lead screw 69 will also rotate idly, unless prevented from rotations in which case it will be displaced axially. Said lead screw 69 may be rotatable in a bore in the feed member 68, so that during setting up of the machine the boring bar can be rotated without axial displacement of the cutter-carrier, a thumb screw 70 being provided in the feed member 68 which can be tightened upon the lead screw 69 so as to lock it against rotation in said feed member whereby the latter is caused at will to move upon the frame bars and so move the displacing rod of the boring bar and with it the cutter-carrier 37.

More particularly a taper boring bar according to the invention is for use in a boring machine having the general characteristics above described, which is intended for boring holes in the flanges of shaft couplings in situ, and more particularly the flanges of drive shafts for ships' propellers. In a machine as described which is adapted for this purpose, said drive gearing is mounted in a case 61 which also presents a platform 71 for a driving electric motor 72, the gear case being unitary with a head stock 63 of generally triangular form in end elevation with the drive pulley 64 mounted in its downwardly directed apex and the frame bars 62 secured parallel to the axis of said drive pulley in the upper corners of said triangular stock. A three-step gear input pulley 86 is driven from a similar motor pulley 87 by a primary drive V-belt 88. A gear output pulley 73 is mounted on a shaft extending from the gear case 61 parallel to and above the level of the frame bars 62, and the lead screw 69 passes through the case, being therein engaged by a nut, with its axis parallel to and in the plane of the axes of the frame bars 62 so that the secondary endless belt 66 passing around said two pulleys 64, 73 runs on either side of said lead screw. The tail steady 67 and feed member 68 are likewise of generally triangular form, apex downwards, the bush in the tail stock being located in its lower corner with its axis precisely aligned with the axis of the drive pulley 64.

The frame bars 62 are supported in a transverse beam 74 which in turn is slidable upon a spaced pair of ground pillars 75 interconnected and maintained in parallel disposition by an upper bridge 76. At its lower end each pillar is secured to a stirrup member 77 having mutually adjustable side plates 78 in which is located a precision ground roller 79 the axis of which is parallel to the frame bars 62. Each of said stirrups also supports a tension element 80 capable of engaging one end of a flexible, inextensible band shown as a roller chain 81 which can be passed as a clamp around the peripheries of a mated pair of flanges 82 of a coupling for a shaft 83. Since the peripheral surfaces of these flanges are machined, by tightening the chain 81 with said tension elements 80 the machine is thus mounted upon the flanges, on which it bears by the pair of spaced rollers 79 mounted in the stirrup 77, with the axes of its frame bars 62 parallel to the axis of shaft 83. Said transverse beam 74 is adjustable upon the pillars 75 by varying with the aid of suitably disposed means, such as screw-threaded means 84, the radial distance (with respect to the shaft axis) of said beam 74 from the bridge 76 which braces the outer ends of the pillars 75. Thereby the radial distance from the shaft axis to the drive pulley axis, and consequently of the taper boring bar, can be determined to effect the boring of holes in the flanges 82 at the required pitch radius.

It will be understood that when the machine is thus set up with a taper boring bar mounted in its drive pulley 64 and in the bush of its tail steady 67 in the manner described, and with the cutter-carrier 37 spaced from one end of the flanges 82 and the displacing rod 47 in abutment with the feed member 68, on the lead screw 69 being made operative to displace said feed member, and with the drive pulley 64 in driven rotation, the taper boring bar is adapted for rotation with simultaneous displacement of the cutter tool 52 axially and obliquely upon the guide bars 18, to cut a taper bore of a hole through said mated flanges 82. The taper boring bar will of course be preset to cut a hole of a predetermined and preferably standard taper.

The head stock 63 of the machine is spaced from said locating stirrups 77 sufficiently to provide space for the driving sleeve head 13 and the attached cheek plates 17 of the guide bars 18, and also for location of the cutter-carrier 37 at this end of said guide bars, between the head stock 63 and the adjacent transverse face of the flanges 82 to be bored. This also enables precision setting of a cutting tool, which may be moved into contact with the starting edge of an existing bore in the flanges (whether cylindrical or taper) and withdrawn again, whereupon the cutter tool can be radially displaced under the control of a direct-reading micrometer mounted radially upon a G-form member which can embrace the cutter-carrier and bear upon its opposite side, so that the cutting tool can be moved outwards by a desired distance, for example $15/1000''$ and the machine operated to commence a taper cut or effect an equivalent enlargement of an existing taper bore.

The invention provides a taper boring bar which is capable of cutting bores with great precision to a predetermined angle of taper, and through solid bodies of considerable thickness. Further, when used in a machine of the kind described, it enables the machine to cut taper bores in confined spaces, more particularly for example in the flanges of shaft couplings, even where such couplings are located close to other elements obstructively surrounding the shaft, such as turbine casings or engine crank shaft casings or gear boxes, represented in FIG. 5 by a flange 85.

What we claim and desire to secure by Letters Patent is:

1. A taper boring bar comprising, in combination, a driving sleeve, a head on said sleeve, a pair of parallel faces on said head tangential to the axis of said sleeve, a pair of cutter-carrier guide bars, each of said bars having one of its ends secured to one of said faces with variable lateral setting, a tail spigot member, said bars having their other ends pivotally attached on a common transverse axis to said tail spigot member, a cutter-carrier slidable between and firmly guided by said guide bars, a displacing member axially slidable within said driving sleeve, means preventing relative rotation of said displacing member and said sleeve, means connecting said displacing member and said cutter-carrier, and means to predetermine the lateral setting of said guide bar head ends relative to the axis of said driving sleeve comprising a pair of lugs on said head ends of sadi guide bars, a calibrated roller supported by said lugs perpendicularly to said parallel faces, an anvil flat on said driving sleeve head perpendicular to said parallel faces, and a selected one of a plurality of calibrating blocks secured to said anvil flat, said bar ends being secured to said parallel faces with said roller in contact with said calibrating block.

2. A taper-boring bar comprising, in combination, a driving sleeve, a head on said sleeve, a pair of parallel faces on said head tangential to the axis of said sleeve, a pair of cutter-carrier guide bars, a pair of cheek plates rigidly secured each at one end of each of said bars, a tail spigot member, means securing the other ends of said guide bars on a common transverse axis to said tail spigot member, slots in said cheek plates tangential to said common transverse axis, screw-threaded bores in said parallel faces exposed through said slots, and set bolts traversing said slots and entering said bores for securing said cheek plates to said parallel faces with variable lateral setting, a cutter-carrier slidable between and firmly guided by said guide bars, a displacing member axially slidable within said driving sleeve and having one end extending between said guide bars, means preventing relative rotation of said displacing member and said sleeve, means connecting said one end of said displacing member and said cutter-carrier, and means to predetermine the lateral setting of said guide bar head ends relative to the axis of said driving sleeve comprising a pair of lugs on said cheek plates, a calibrated roller supported by said lugs perpendicularly to said parallel faces, an anvil flat on said driving sleeve head perpendicular to said parallel faces, and a selected one of a plurality of calibrating blocks secured to said anvil flat, said cheek plates being secured to said parallel faces by tightening of said set bolts with said roller in contact with said calibrating block.

3. A taper boring bar comprising, in combination, a driving sleeve, a head on said sleeve, a pair of parallel faces on said head tangential to the axis of said sleeve, a pair of cutter-carrier guide bars, a pair of cheek plates rigidly secured each at one end of each of said bars securing said end to one of said faces with variable lateral setting, a tail spigot member, means securing the other ends of said guide bars on a common transverse axis to said tail spigot member, slots in said cheek plates tangential to said common transverse axis, screw-threaded bores in said parallel faces exposed through said slots, and set bolts traversing said slots and entering said bores for securing said cheek plates to said parallel faces with variable lateral setting, a cutter-carrier slidable between and firmly guided by said guide bars, a displacing member axially slidable within said driving sleeve and having one end extended between said bars, means preventing relative rotation of said displacing member and said sleeve, means connecting said one end of said displacing member and said cutter-carrier for positive joint displacement axially comprising an eye on said one end of said displacing member, and a pin mounted in said cutter-carrier traversing the axis of said drive sleeve and passing through said eye to enable transverse displacement of the cutter-carrier relative to said displacing member, and means to predetermine the latteral setting of said cheek plates relative to the axis of said driving sleeve comprising a pair of lugs on said cheek plates, a calibrated roller supported by said lugs perpendicularly to said parallel faces, an anvil flat on said driving sleeve head perpendicular to said parallel faces, and a selected one of a plurality of calibrated blocks secured to said anvil flat, said cheek plates being secured to said parallel faces by tightening of said set bolts with said roller in contact with said calibrating block.

4. A taper boring machine comprising, in combination, a pair of parallel frame bars, means serving to secure said frame bars to an element having an initial bore to be enlarged, a head stock mounted on said frame bars, an annular driving element rotatable in said head stock on an axis parallel to the axes of said frame bars, a tail steady adjustably slidable on said frame bars, a feed member slidable on said frame bars, a lead screw engaging said feed member and parallel to said frame bars, means operable to lock said lead screw against rotation in said feed member, and rotatable nut means in said head stock serving to displace said lead screw axially when locked against rotation, in further combination with a taper boring bar comprising a driving sleeve secured in said annular driving element to be rotatable therewith, a head on said sleeve, a pair of parallel faces on said head tangential to the axis of said sleeve, a pair of cutter-carrier guide bars to be extended through said initial bore, each of said guide bars having one of its ends secured to one of said faces with variable lateral setting, a tail spigot member mounted for rotation co-axially with said driving sleeve in said tail steady, said guide bars having their other ends pivotally attached on a common axis to said tail spigot member, a cutter-carrier slidable between and firmly guided by said guide bars, a displacing member axially slidable within said driving sleeve and extending between said guide bars having one end extended between said bars and the other end projecting from said sleeve, said other end of said displacing member being disposed to be borne upon for axial displacement by said feed member, means preventing relative rotation of said displacing member and said sleeve, means connecting said one end of said displacing member and said cutter-carrier, and means to predetermine the lateral setting of said guide bar head ends relative to the axis of said driving sleeve.

5. A taper boring machine comprising, in combination, a pair of parallel frame bars, a transverse beam in which said frame bars are secured and supported, a spaced pair of bores in said beam perpendicular to said frame bars, a spaced pair of pillars, an upper bridge interconnecting and maintaining in their parallel disposition said pillars, means adjustable to vary the distance of said beam from said bridge and means on the lower end of said pillars serving to secure said frame bars to an element having an initial bore to be enlarged, a head stock mounted on said frame bars, an annular driving element rotatable in said head stock on an axis parallel to the axes of said frame bars, a tail steady adjustably slidable on said frame bars, a feed member slidable on said frame bars, a lead screw engaging said feed member and parallel to said frame bars, means operable to lock said lead screw against rotation in said feed member, and rotatable nut means in said head stock serving to displace said lead screw axially when locked against rotation, in further combination with a taper boring bar comprising a driving sleeve secured in said annular driving element to be rotatable therewith, a head on said sleeve, a pair of parallel faces on said head tangential to the axis of said sleeve, a pair of cutter-carrier guide bars to be extended through said initial bore, each of said guide bars having one of its ends secured to one of said faces with variable lateral setting, a tail spigot member mounted for rotation co-axially with said driving sleeve in said tail steady, said guide bars having their other ends pivotally attached on a common axis to said tail spigot member, a cutter-carrier slidable between and firmly guided by said guide bars, a displacing member axially slidable within said driving sleeve having one end extended between said bars and the other end projecting from said sleeve, said other end of said displacing member being disposed to be borne upon for axial displacement by said feed member, means preventing relative rotation of said displacing member and said sleeve, means connecting said one end of said displacing member and said cutter-carrier, and means to predetermine the lateral setting of said guide bar head ends relative to the axis of said driving sleeve.

6. A taper boring bar comprising, in combination, a driving sleeve, a head on said sleeve, a pair of parallel faces on said head tangential to the axis of said sleeve, a tail spigot member, a pair of cutter-carrier guide bars, each of said bars having one of its ends secured to one of said faces with variable lateral setting, said bars having their other ends pivotally attached on a common transverse axis to said tail spigot member, said spigot member being spaced from and connected to said driving sleeve solely by said guide bars, a cutter-carrier having two opposed recesses in each of which one of said guide bars is embraced so that said cutter-carrier is slidable between and firmly guided by said guide bars, a displacing rod axially slidable within said driving sleeve and having one end extended between said guide bars, means preventing relative rotation of said displacing member and said sleeve, means connecting said one end of said displacing member to said cutter-carrier, and means to predetermine the lateral setting of said guide bar ends secured to said faces of the driving sleeve relative to the axis of said sleeve.

References Cited in the file of this patent

UNITED STATES PATENTS

| 1,452,320 | Staempfli | Apr. 17, 1923 |
| 2,368,476 | King | Jan. 30, 1945 |
| 2,626,540 | Eserklan | Jan. 27, 1953 |
| 2,727,414 | Badders | Dec. 20, 1955 |
| 2,887,908 | Miller | May 26, 1959 |

FOREIGN PATENTS

| 794,826 | Great Britain | May 14, 1958 |